United States Patent
Moore

(10) Patent No.: US 6,202,743 B1
(45) Date of Patent: Mar. 20, 2001

(54) UNDERGROUND WELL ELECTRICAL CABLE TRANSITION WITH SEALS AND DRAIN

(75) Inventor: Boyd B. Moore, 427 Mignon, Houston, TX (US) 77024

(73) Assignee: Boyd B. Moore, Houston, TX (US)

( * ) Notice: Subject to any disclaimer, the term of this patent is extended or adjusted under 35 U.S.C. 154(b) by 0 days.

(21) Appl. No.: 09/010,363

(22) Filed: Jan. 21, 1998

Related U.S. Application Data

(63) Continuation-in-part of application No. 08/633,244, filed on Apr. 16, 1996, now Pat. No. 5,762,135.

(51) Int. Cl.$^7$ .............................. E21B 29/02; E21B 43/00; H02G 3/18
(52) U.S. Cl. .................. 166/65.1; 166/97.5; 174/65 SS; 174/17 VA; 439/191; 439/198; 439/204
(58) Field of Search ................................. 166/65.1, 97.5; 174/65 SS, 17 VA; 439/190, 191, 192, 194, 195, 271, 272, 205, 206, 936

(56) References Cited

U.S. PATENT DOCUMENTS

| | | | |
|---|---|---|---|
| 3,437,149 | * | 4/1969 | Cugini et al. .................. 166/379 |
| 3,638,732 | * | 2/1972 | Huntsinger et al. ............ 166/315 |
| 3,739,073 | * | 6/1973 | Schneider et al. ............. 166/65.1 |
| 3,764,728 | * | 10/1973 | Howie et al. .................. 174/76 |
| 3,781,456 | * | 12/1973 | Knowles et al. ............... 166/65.1 X |
| 3,871,734 | * | 3/1975 | Murtland ....................... 439/275 |
| 4,090,565 | * | 5/1978 | McGee .......................... 166/315 |
| 4,154,302 | * | 5/1979 | Cugini .......................... 166/65.1 X |
| 4,491,176 | * | 1/1985 | Reed ............................. 166/66.4 |
| 4,553,590 | * | 11/1985 | Phillips ........................ 166/53 |
| 4,583,804 | * | 4/1986 | Thompson ..................... 339/60 M |
| 4,627,489 | * | 12/1986 | Reed ............................. 166/65.1 |
| 4,627,490 | * | 12/1986 | Moore ........................... 166/65.1 |
| 4,708,201 | * | 11/1987 | Reed ............................. 166/65.1 |
| 4,854,886 | * | 8/1989 | Neuroth ........................ 439/192 |
| 4,927,386 | * | 5/1990 | Neuroth ........................ 439/589 |
| 5,051,103 | * | 9/1991 | Neuroth ........................ 439/192 |
| 5,058,683 | * | 10/1991 | Godfrey et al. ............... 166/65.1 X |
| 5,289,882 | * | 3/1994 | Moore ........................... 166/65.1 X |
| 5,377,747 | * | 1/1995 | Didier ........................... 166/65.1 |
| 5,558,532 | * | 9/1996 | Hopper .......................... 439/310 |
| 5,642,780 | * | 7/1997 | Moore ........................... 166/65.1 |
| 5,722,844 | * | 3/1998 | Schraeder ...................... 439/194 |
| 5,732,771 | * | 3/1998 | Moore ........................... 166/65.1 |
| 5,762,135 | * | 6/1998 | Moore ........................... 166/65.1 |
| 5,795,169 | * | 8/1998 | Reed ............................. 439/191 |
| 5,823,256 | * | 10/1998 | Moore ........................... 166/65.1 |

FOREIGN PATENT DOCUMENTS 9425726  11/1994  (WO) ......................................... 5/1

* cited by examiner

Primary Examiner—Eileen D. Lillis
Assistant Examiner—Jong-Suk Lee
(74) Attorney, Agent, or Firm—Fulbright & Jaworski LLP; Paul E. Krieger, Esq.

(57) ABSTRACT

A transition for electrical well cable through the wellhead barrier of an underground well leads to an electrical power cable connected to an above-ground electrical power source, where the only connection between the electrical well cable and the electrical power cable is formed inside the wellhead barrier, between approved primary and secondary seals. A drain or vent to the atmosphere is also located between the seals.

2 Claims, 14 Drawing Sheets

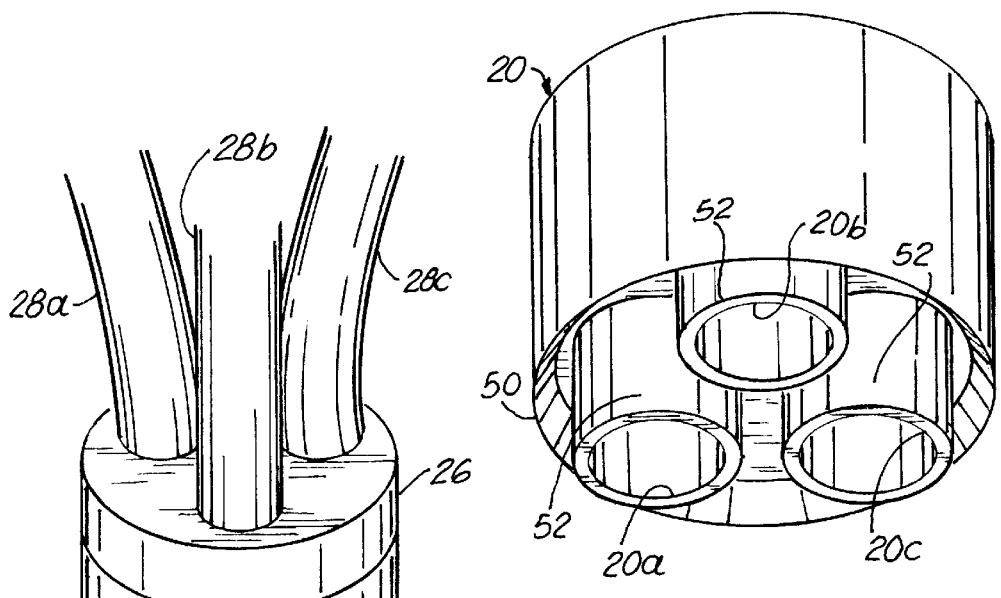
FIG. 7
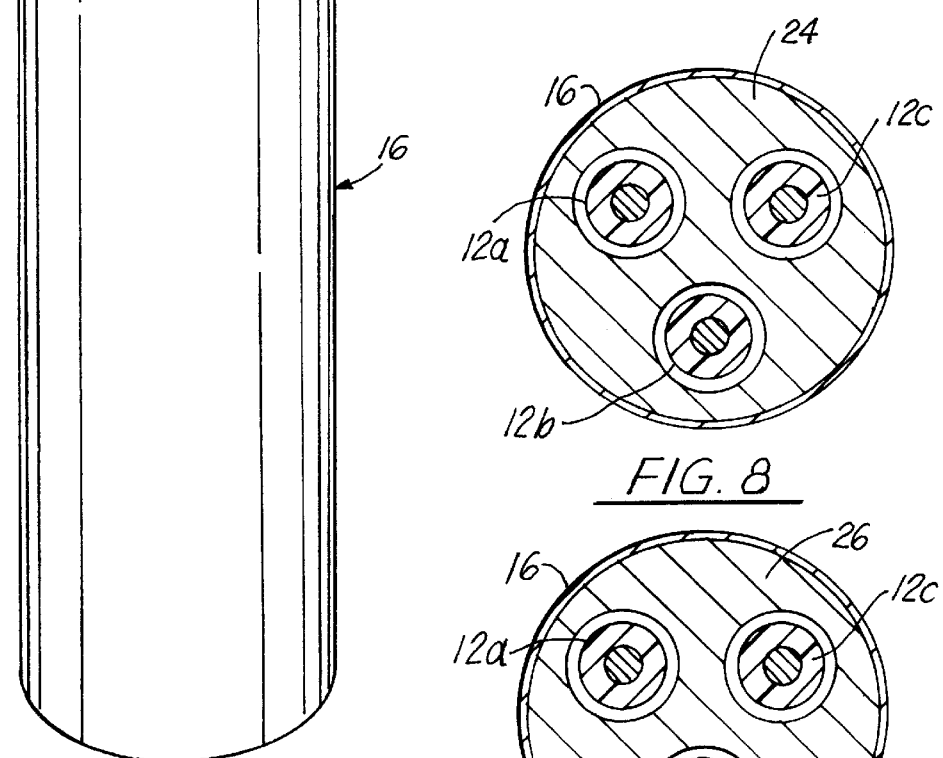
FIG. 6
FIG. 8
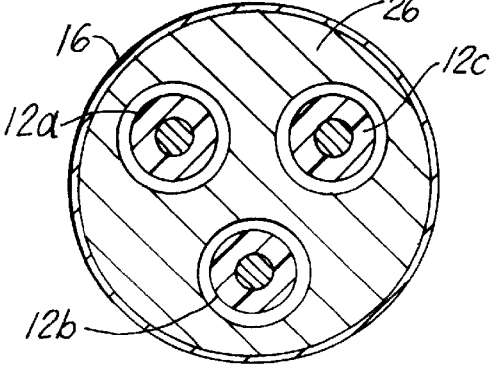
FIG. 9

UNDERGROUND WELL ELECTRICAL CABLE TRANSITION WITH SEALS AND DRAIN

RELATED APPLICATION

This application is a continuation-in-part of U.S. patent application Ser. No. 08/633,244, filed Apr. 16, 1996, entitled "Underground Well Electrical Cable Transition, Seal and Method;" now U.S. Pat. No. 5,762,135.

BACKGROUND OF THE INVENTION

1. Field of the Invention

The present invention relates to an improved electrical cable transition and method for an underground well and, more particularly, to a simplified, low cost, transition and method for such a cable. The transition includes NRTL approved primary and secondary seals and a cable connection between the seals along with a drain or vent for venting combustible or flammable well fluids to the atmosphere in case the primary seal leaks.

2. Description of the Related Art

In underground wells such as oil wells, electrical power is furnished to submersible pumps and other downhole equipment through insulated electrical conductors that extend through conduit in the well casing. In order to connect the downhole equipment to a power source outside the well, these conductors must penetrate a wellhead barrier that is sealed to a top opening of the casing. The configuration of cables and seals in the wellhead is called a "penetrator," the purpose for which is to provide a transition zone where the cable penetrates the wellhead barrier, and gas and other fluids are prevented from leaking both into and out of the well.

Because the downhole equipment must be connected to an above-ground power source, a splice or other connection must be formed between cable connected to the power source and cable extending from the downhole equipment. This splice has been formed below the wellhead barrier in the past, which isolates the splice from the area around the outside of the wellhead barrier which is classified as a hazardous location.

Such hazardous locations are referred to as being "classified" because they are defined or classified by industry standards such those promulgated by the American Petroleum Institute. The equipment and facilities for such classified locations must be in compliance with the Occupational Safety and Health Act ("OSHA") Section 1910, Subpart S, for locations where hazardous concentrations of gases or vapors are present because of leakage.

A penetrator which has gained acceptance in the oil industry is shown and described in U.S. Pat. No. 5,829,882, which has the same inventor as the inventions described below. This penetrator solved the problem of providing a sealed arrangement for supplying electrical power to a sealed wellhead over a petroleum producing well bore in an area classified as hazardous, where explosions or fires may occur due to gases and other substances associated with the production of petroleum products being ignited by electric arcs. The penetrator in U.S. Pat. No. 5,289,882, included a rigid conduit with a splice fitting formed below the wellhead barrier, for connecting the downhole electrical conductors of a wellbore power cable with electrical conductors extending from a power source on the surface. A rigid conduit was provided for containing the conductors in the well, as they extended from the splice fitting to a rigid conduit outside the wellhead barrier which had a breather vent to inhibit the passage of fluids from the downhole electrical conductor to the power source electrical conductor. An arrangement was also provided for securing the power source electrical conductor adjacent a wellhead to supply power to the downhole electrical conductor by extending into the sealed barrier associated with the wellhead and inhibiting explosions and fires in a hazardous area.

Improvements over the penetrator in U.S. Pat. No. 5,829,882, are described in PCT application WO 94/25726, and related, pending U.S. patent applications, which is a continuation-in-part of U.S. Pat. No. 5,829,882.

While these types of penetrators have proven to be safe and effective, they require a relatively large number of parts and, since the splice between the electrical conductors for the downhole equipment and the power source is located below the wellhead barrier, they require a substantial amount of time to complete.

The problems discussed above were solved by the invention described in pending U.S. Pat. Ser. No. 08/633,244, filed Apr. 16, 1996, entitled "Underground Well Electrical Cable Transition, Seal and Method." That invention dealt with a transition for electrical well cable through the wellhead barrier of an underground well leading to an electrical power cable connected to an above-ground electrical power source, a confined seal for the transition, and a method for forming the transition.

The transition for that invention included a length of electrical well cable extending uninterrupted from an underground well through the wellhead barrier, a connection between the underground well cable and the electrical power cable, the connection being formed outside the wellhead barrier within an area adjacent to the wellhead barrier classified as a hazardous location. The connection is listed and approved for hazardous locations by a nationally recognized testing laboratory ("NRTL") such as, for example, Factory Mutual Research Corporation. A confined seal is located in the well around the electrical well cable for blocking the flow of fluid into or out of the well.

That invention applied to electrical well cable which has an outer protective cable coating and a plurality of insulated electrical conductors projecting from the protective cable coating. A typical electrical well cable includes three electrical conductors, but the invention could be applied to other types of electrical well cable in various shapes, sizes and configurations.

The transition included a primary conduit with an inner surface defining an elongated opening, the primary conduit extending through at least a portion of the wellhead barrier and surrounding a portion of the electrical conductors and a portion of the protective cable coating. An elastomeric seal was provided in the primary conduit for sealing the space between the electrical conductors and the inner surface of the conduit. The elastomeric seal had opposed faces, and a relatively hard backing material located in the primary conduit abutting against both faces of the elastomeric seal. The relatively hard backing material was located around and between the conductors in the inner surface of the conduit. The backing material could also surround at least a part of the protective cable coating that extends into the elongated opening of the primary conduit.

The transition also included an elongated rigid conduit extending between the primary conduit and an opening in the wellhead barrier for each of the conductors. A fluid-tight connection was formed between one end of the elongated conduits and the primary conduit and also between the other end of the elongated conduits and the wellhead barrier openings.

One of the fluid-tight connections included a manifold cap connected to the primary conduit, with openings in the manifold cap for receiving the elongated rigid conduits. A back-up bushing is positioned between the relatively hard backing material and the manifold cap. The backing material was preferably formed of an epoxy putty with good dielectric properties that is resistant to well fluids and which is compressed before it hardens to surround the conductors and fill the spaces in the elongated opening in the primary conduit. The elastomeric seal was preferably formed of synthetic rubber.

A method for forming the confined elastomeric seal included exposing at least one insulated electrical conductor by removing the outer protective coating from a portion of electrical well cable that extends uninterrupted from downhole electrical equipment. A relatively hard backing material, such as the epoxy putty mentioned above, was positioned around the insulated conductor cable and abutting opposing faces of the elastomeric seal. The backing material extended along the insulated electrical conductor on both sides of the seal.

The seal and relatively hard backing material were surrounded along the length of the insulated electrical conductor with a primary conduit for isolating the insulated electrical conductor from the well and forming a seal around the conductor. The seal was then confined between the portions of hardened backing material to prevent well fluids from flowing both into and out of the well between the insulated electrical conductor and the primary conduit.

The elastomeric seal was preferably formed with an outer diameter larger than the opening of the primary conduit, and with openings for receiving the insulated electrical conductors, which are smaller than the outer diameter of the conductors for providing a tight seal between adjacent surfaces. The seal was confined by compressing the epoxy putty before it hardens to fill all the spaces in the primary conduit and around the elastomeric seal, insulated electrical conductor and electrical well cable. A compressing tool connected between the primary conduit and the electrical well cable could be used to compress the epoxy putty and extrude it before it hardens into all of the spaces in the primary conduit.

SUMMARY OF THE INVENTION

While the penetrator systems described above have been found workable, the invention in this application is directed to a much less expensive system that can be easily and quickly installed with lower hardware and installation costs. The system is designed to comply with electrical codes as well as OSHA regulations by providing primary and secondary seals or barriers approved by a NRTL, in addition to providing a connection or splice in the wellhead. A drain or vent (hereinafter called a "vent") is located between the seals for venting combustible or flammable fluids to the atmosphere in case a leak occurs in the primary seal. A flame arrestor type vent can be provided for applications in Class 1, Div. 1 hazardous locations.

The primary and secondary seals can be formed with the same structure described in U.S. patent application Ser. No. 08/633,244, filed Apr. 16, 1996, or other approved seals or barriers can be used.

BRIEF DESCRIPTION OF THE DRAWINGS

A better understanding of the present invention can be obtained when the following detailed description of exemplary embodiments is considered in conjunction with the following drawings, in which:

FIG. 6 is a perspective view of the primary rigid conduit that encases the seal in FIGS. 4 and 5, and the elongated conduits that extend from the primary conduit to the wellhead barrier;

FIG. 7 is a perspective view of an elastomeric seal that seals the insulated electrical conductors in the primary conduit in FIGS. 4 and 5;

FIG. 8 is a sectional view looking along line 8—8 of FIG. 5;

FIG. 9 is a sectional view looking along line 9—9 of FIG. 5;

DETAILED DESCRIPTION OF EXEMPLARY EMBODIMENTS

The subject invention relates to a penetrator for electrical conductor cable which transmits electrical power from an above-ground remote electrical power source (not shown) to downhole electrical equipment such as submersible pumps. Penetrators which have previously been sold, such as the one shown and described in U.S. Pat. No. 5,289,882 and PCT application WO 94/25726, involve the formation of a splice in or below the wellhead barrier, between the conductor cable connected to the downhole equipment and the conductor cable connected to the remote power source.

The invention described in detail in U.S. patent application Ser. No. 08/633,244, filed Apr. 16, 1996, was directed to a different type of transition or penetrator for electrical conductor cable which eliminated the splice between the cable connected to the downhole equipment and the power source conductor cable. In other words, any break or interruption in the electrical cable from the downhole equipment was eliminated as it extended through in the well. The invention also included a unique, self-energized, confined seal in the well around the cable, which effectively blocks fluid from flowing either into or out of the well, and a method of forming such a seal and transition. By providing for this type of transition, cost is significantly lowered by reducing the number of parts required and the installation time, without compromising well safety.

Figure 3:
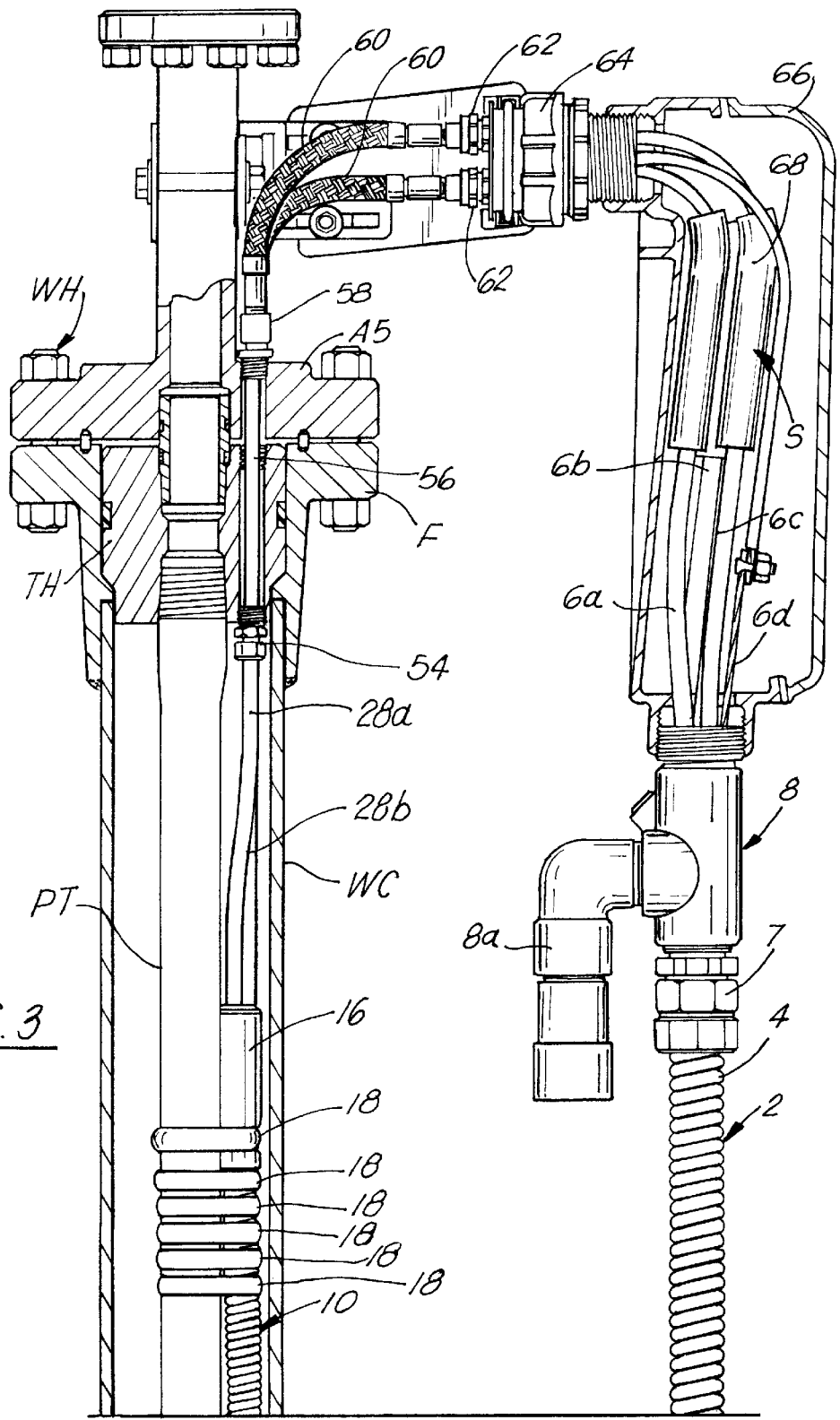
FIG. 3 is a side elevational view, partially in section, of the wellhead barrier and electrical penetrator system of FIG. 2, which shows a prior art splice connection outside the wellhead barrier.

The invention in this continuation-in-part application is directed to a transition or penetrator for electrical conductor cable which utilizes a connection such as a splice or plug and receptacle connector between the cable connected to the downhole equipment and the power source conductor cable, located between approved primary and secondary seals. The transition also includes a vent located between the seals for venting well fluids to the atmosphere if the primary seal fails. By utilizing this type of system, the need for a splice or other connector outside the wellhead, as shown in FIG. 3, is eliminated. This system substantially lowers the number of parts and the installation time by providing a system that is substantially different from the one described in detail in U.S. patent application Ser. No. 08/633,244, filed Apr. 16, 1996.

Figure 1:
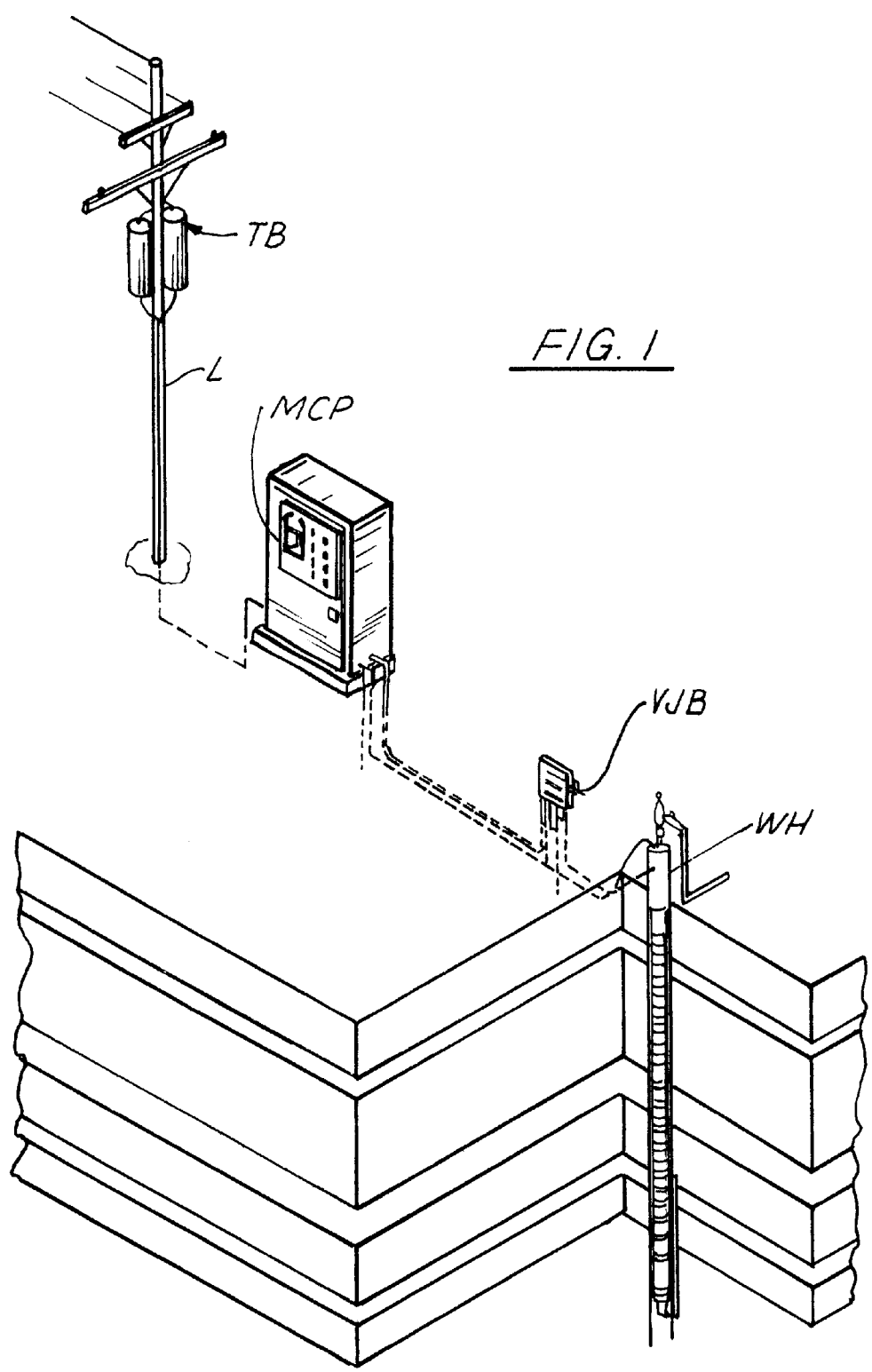
FIG. 1 is a schematic drawing of surface equipment for an underground well, which shows the environment for the present invention.

Before describing the invention in detail, it might be useful to understand the surface equipment used in providing power to downhole equipment. Referring to FIG. 1, reference letters TB refer to a transformer bank on a power pole for conducting power via line L to a motor control panel MCP. The conductor vires from the motor control panel are run to a vented junction box VJB, which in turn is connected to a wellhead barrier WH of an underground well. The schematic diagram in FIG. 1 illustrates well-known equipment both above-ground and below-ground for an underground well. A more detailed explanation is not necessary as this equipment is well-known to those skilled in the art.

Figure 2:
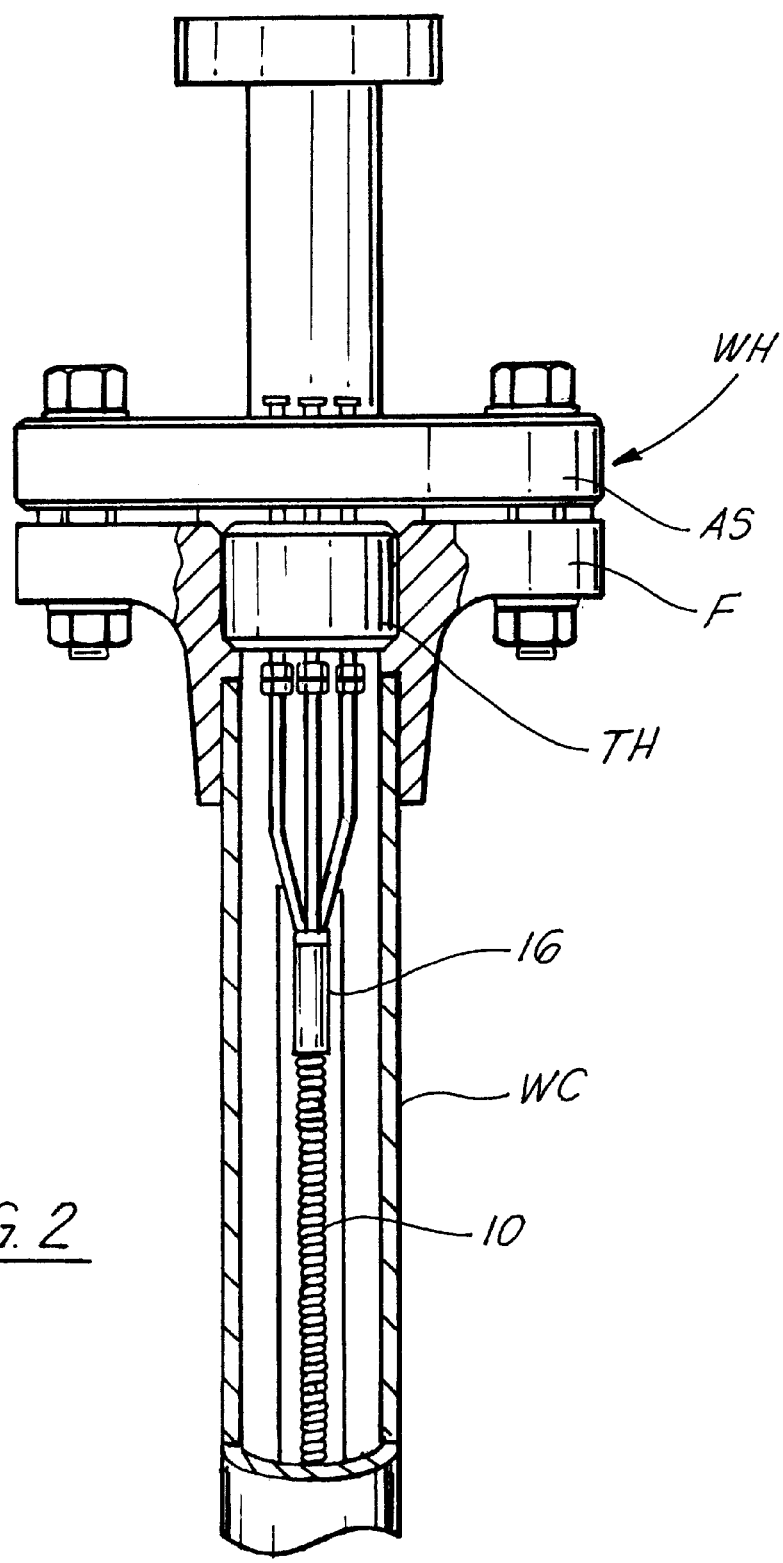
FIG. 2 is a front elevational view, partially in section, of the wellhead barrier of an underground well with an electrical penetrator utilizing the invention, of U.S. patent application Ser. No. 08/633,244, filed Apr. 16, 1996, entitled "Underground Well Electrical Cable Transition, Seal and Method;" now U.S. Pat. No. 5,762,135.

FIGS. 2 and 3 are front and side views, respectively, of the wellhead barrier WH, which includes the transition formed in accordance with the invention in U.S. patent application Ser. No. 08/633,244, filed Apr. 16, 1996. The remote power source shown in FIG. 1 furnishes conventional three-phase power through conductor cable with three conductors. However, other types and sizes of conductor cable can be used in accordance with the invention.

As best shown in FIG. 3, power from the remote power source is transmitted to the well through an electrical conductor cable 2, which is connected to the remote power source (not shown). The conductor cable 2 has an outer protective coating 4 known as an armored cladding, which is typically covered by an impervious polymer sheath, that is well known in the industry. The conductor cable 2 also includes three insulated conductors 6a, 6b and 6c, that carry the three-phase power, and one uninsulated ground conductor 6d.

The remote power source is located in a safe zone, which is a zone outside a hazardous location adjacent to the well which might contain gases and other fluids originating from the well. The term "hazardous location" as used herein is that area around a wellhead barrier that is classified as hazardous under industry standards as described above.

The conductors 6a, 6b and 6c extend through an electrical cable seal termination 7, which connects to a conduit seal fitting 8 which is used as a Tee for a breather drain or vent 8a. The Tee 8 is in turn connected to a conduit outlet body or housing 66 which houses an electrical splice generally designated by reference letter S, all of which are located outside the wellhead barrier WH.

The splice S is described in greater detail below and is used to connect the conductor cable 2 to a conductor cable 10 that is connected to and extends from downhole electrical equipment (not shown). The splice S is also described in detail in U.S. Pat. No. 5,289,882, and PCT application WO 94/25726, and has been approved by Factory Mutual Research Corporation, which is a nationally recognized testing laboratory, for locations classified as hazardous. However, unlike the invention in U.S. Pat. No. 5,289,882 and PCT application WO 94/25726, the splice S, which is located outside the wellhead barrier WH, was the only connection between the conductor cable 2 from the power source and the conductor cable 10 in U.S. patent application Ser. No. 08/633,244, filed Apr. 16, 1996. For the invention in this continuation-in-part application, the splice S and its associated hardware are eliminated, and the only splice is located inside the wellhead barrier WH.

In order to provide an effective electrical transition from the wellhead barrier WH to the external power source, without the need for a splice or other electrical connection in or below the wellhead barrier WH, an effective seal was described in U.S. patent application Ser. No. 08/633,244, filed Apr. 16, 1996, in order to prevent gases and other fluids from being transmitted from the well through the wellhead barrier WH to the outside, through or around the electrical conductor cable 10 from downhole equipment. This is a seal that has been approved by a NRTL. This seal is also useful in the invention described in this continuation-in-part application.

When a downhole pump (not shown) is turned off, pressure inside the well casing can typically range between 50–3,000 psi. This exerts a high pressure along the electrical conductor cable 10 which, if an effective seal is not provided, could cause gas and other liquids to leak out of the wellhead barrier WH. Also, when the downhole pump is turned on or the casing is vented, pressure inside the casing rapidly decreases. This causes gases and other fluids entrained in and around seals, cable insulation and the cable jacket to expand, which could cause the seals to fail and blow out of the primary conduit 16. The confined seal described in U.S. patent application Ser. No. 08/633,244, filed Apr. 16, 1996, effectively blocks the flow of fluid in both directions under the conditions described. The seal, which is described in greater detail below, was part of the penetration system of the invention in U.S. patent application Ser. No. 08/633,244, filed Apr. 16, 1996, and could be used as either or both of the primary and secondary seals of the invention in this continuation-in-part application.

Figure 4:
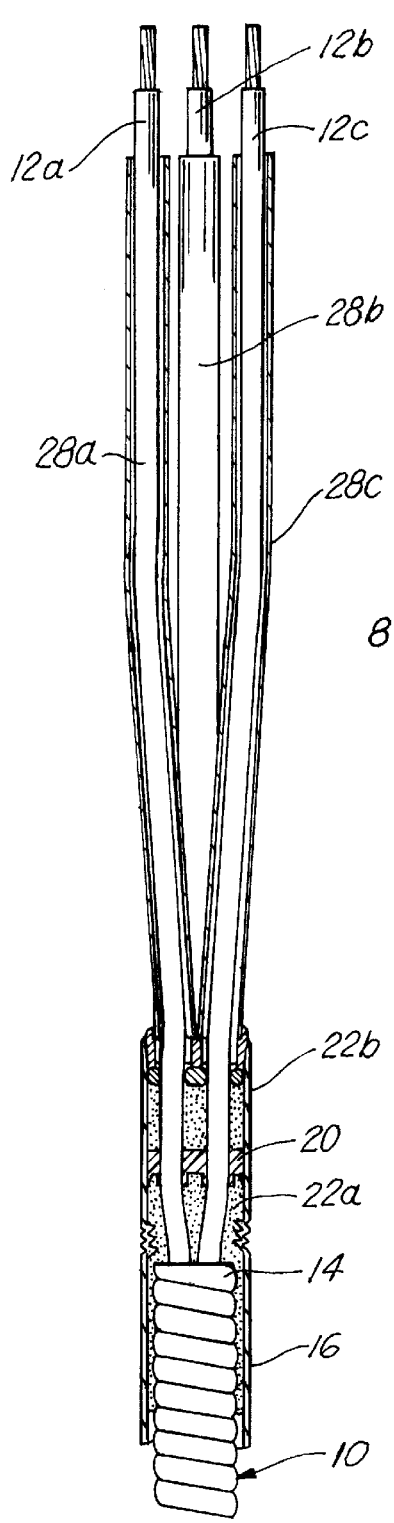
FIGS. 4 and 5 are partial sectional views of the penetrator of FIGS. 1 and 2, showing in particular details of the seal for blocking the flow of fluid from around insulated electrical conductors.
Figure 5:
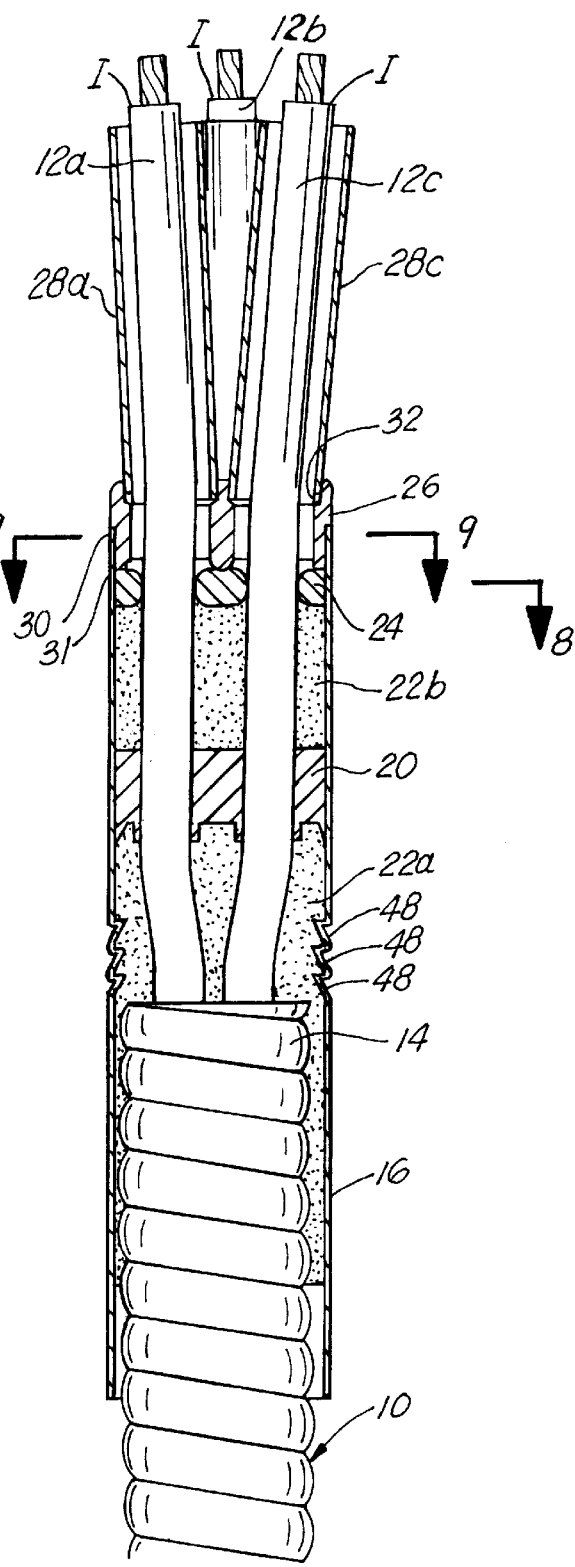

As shown in FIGS. 4 and 5, the conductor cable 10 contains three insulated conductors 12a, 12b and 12c. Like the conductor cable 2, the conductor cable 10 is armored, which means it has an outer protective coating 14. The spaces between the conductors 12a, 12b and 12c and the protective coating 14 are filled with a dielectric cable insulation (not shown) that is well known and encapsulates the conductors.

The conductor cable 10 extends into a rigid primary conduit 16, in which the confined two-way seal is formed. As best shown in FIG. 3, the conductor cable 10 and the primary conduit 16 are secured to a length of production tubing PT through a plurality of cable bands 18. As shown, five cable bands 18 can be used to hold the conductor cable 10 to the production tubing PT, while another, upper cable band secures the primary rigid conduit 16 to the production tubing PT.

Figure 10:
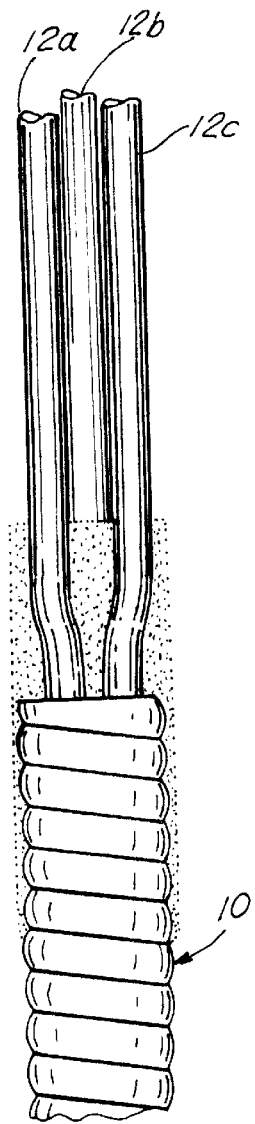
FIGS. 10–14 are front elevational views, partially in section, that illustrate a method of forming the transition seal shown in FIGS. 4 and 5.

The seal in the primary conduit 16 is formed, as shown in FIG. 10, by first trimming the armor cladding 14 and internal cable insulation (not shown) that encapsulates the insulated conductors, to expose the insulated conductors 12a, 12b and 12c, so they can extend through the wellhead barrier WH and into the area outside of the wellhead WH classified as a hazardous location. As shown in FIG. 5, the insulation I is maintained on each of the conductors.

As shown in FIG. 10, an epoxy putty, designated generally by reference numeral 22a, is packed around the conductors 12a, 12b and 12c, and also around the trimmed-off end of the armored coating 14, so that the epoxy putty 22a extends a short distance along the outer surface of the coating 14.

The epoxy putty is preferably a hand-kneadable, two-part epoxy that hardens in a relatively short period of time after it is mixed and packed around the conductors 12a, 12b and 12c (for example, from 3–30 minutes). The putty must have a very low shrinkage upon hardening and also be resistant to well fluids. It must also have good dielectric qualities and be stable at temperatures up to at least 200° F. There are commercially-available putties of this type on the market from manufacturers such as Polymeric Systems, Inc., Phoenixville, Pa. and Glenmarc Manufacturing, Inc., Spring Grove, Ill. Other known poured or liquid epoxies or cements could also be used.

Figure 11:
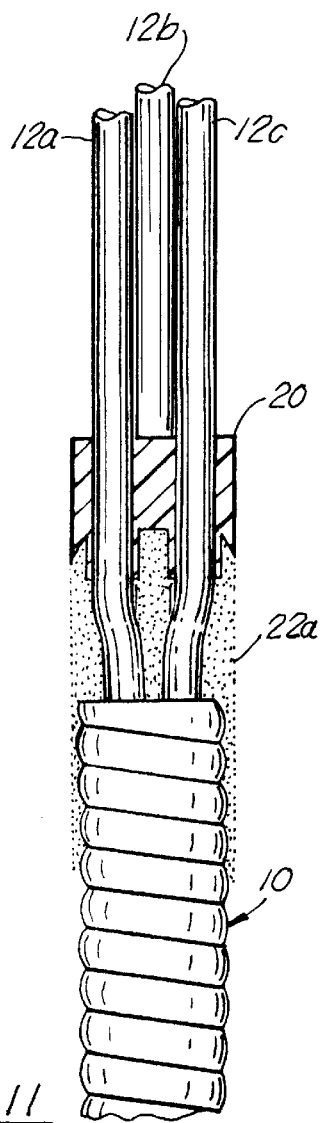

Referring to FIG. 11, an elastomeric seal 20 (shown in detail in FIG. 7) with openings 20a, 20b and 20c, is positioned on the conductors 12a, 12b and 12c, above the epoxy putty 22a that was packed as described above. The seal is preferably formed of a synthetic rubber, but can be formed of any elastomeric material with dielectric properties, that is resilient and resistant to well fluids. The seal 20 has an outer diameter that is slightly larger than the inside diameter of the primary conduit 16 to form an interference fit and an initial seal.

Figure 12:
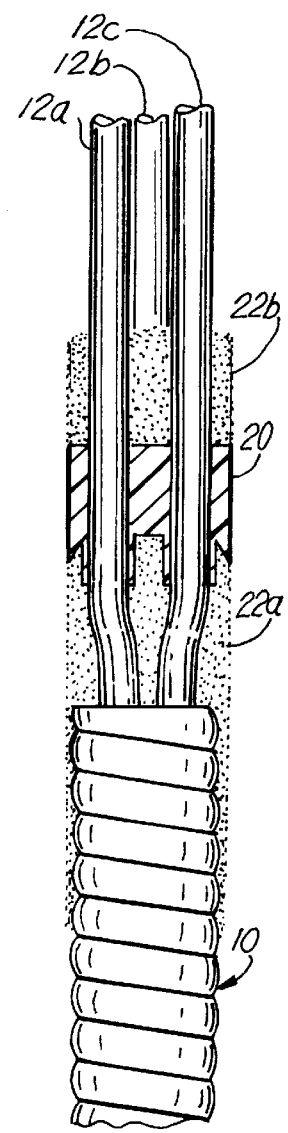

After the seal 20 is positioned as shown in FIG. 11, a second amount of epoxy putty 22b is packed above the seal 20 and around the conductors 12a, 12b and 12c as shown in FIG. 12.

Figure 13:
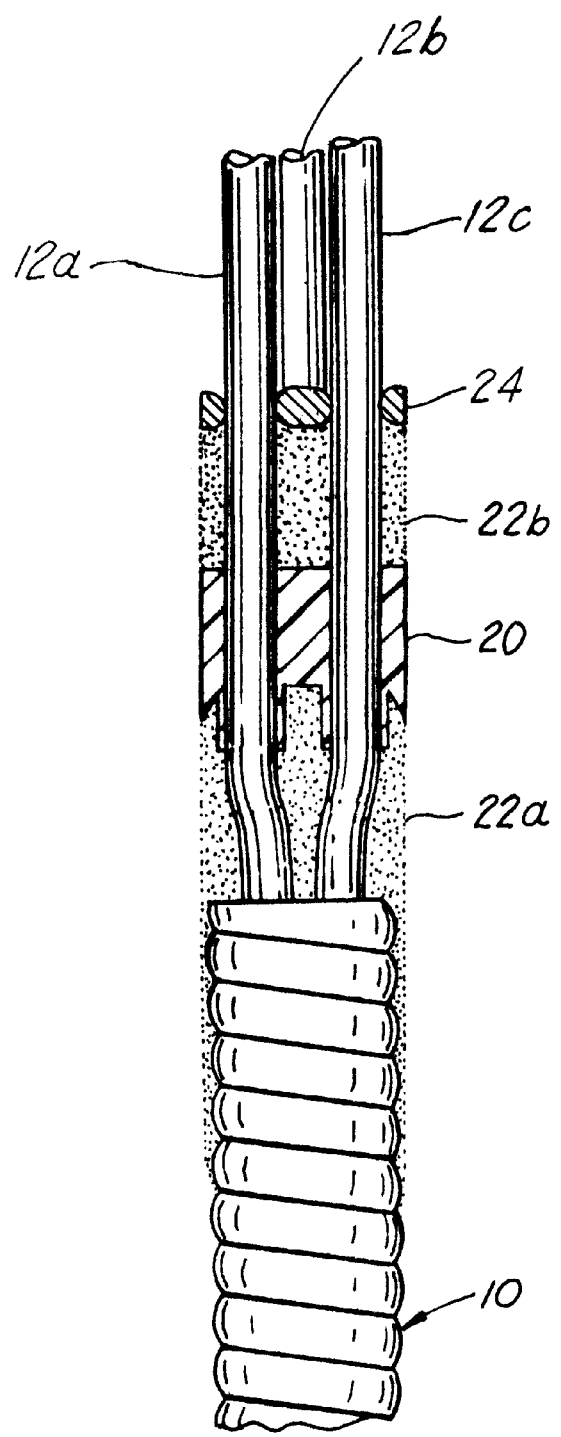
Figure 14:
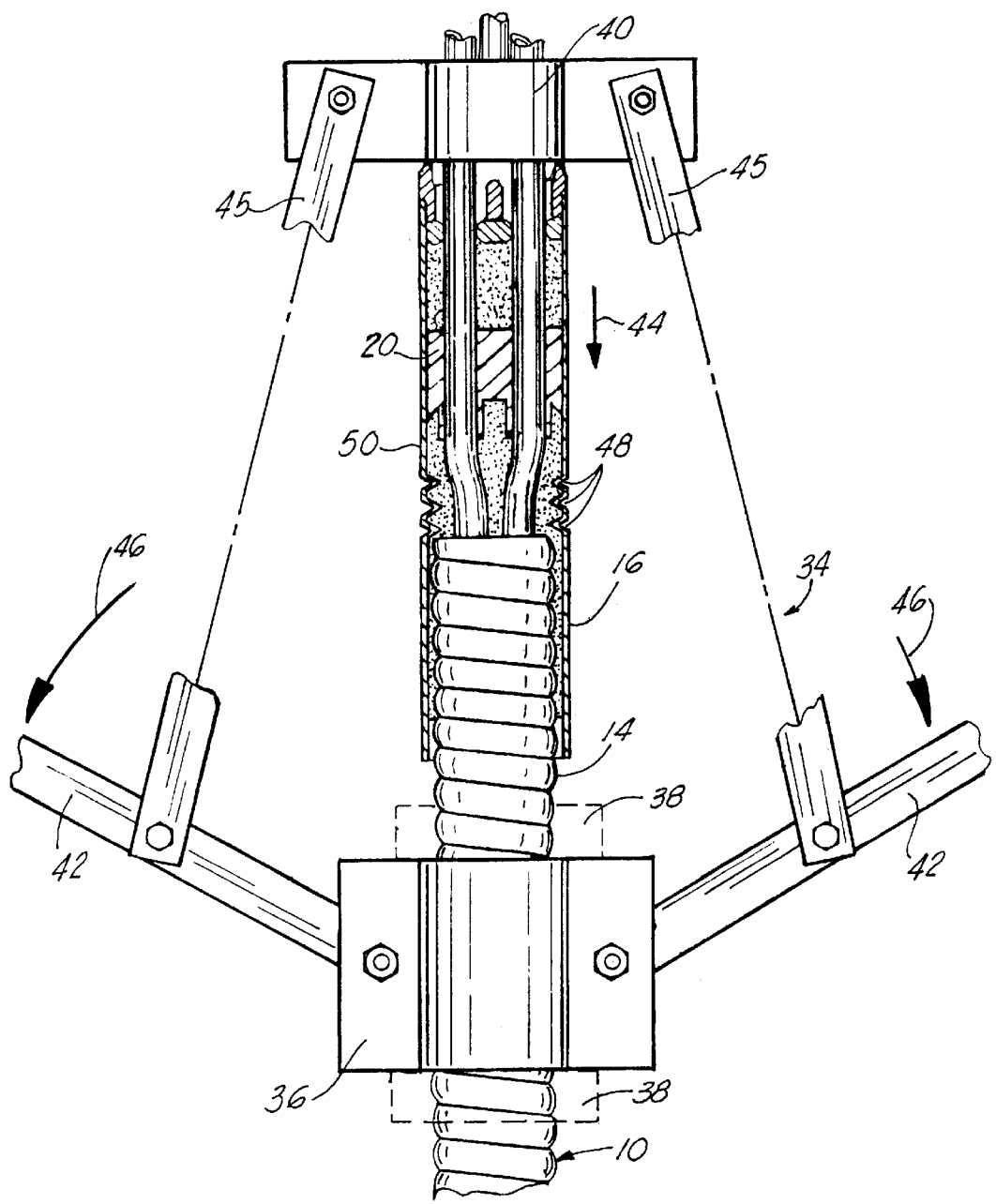

As shown in FIG. 13, after the epoxy putty 22a and 22b is packed as shown in FIG. 12, a back-up bushing 24 is positioned on the conductors 12a, 12b and 12c into engagement with the upper end of the epoxy putty 22b. The back-up bushing 24 is formed of a non-ferromagnetic material such as brass, and is shown best in FIGS. 5 and 13, and the sectional view in FIG. 8. After the elastomeric seal 20 and back-up bushing 24 are positioned as shown and the epoxy putty 22 is packed as shown in FIG. 12, the primary conduit 16 is installed as shown in FIG. 14. During this installation process, the epoxy putty has not yet hardened and is still formable.

As shown best in FIGS. 5 and 6, a manifold cap 26 is mounted on the primary conduit 16, over the conductors 12a, 12b and 12c. Three rigid, elongated conduits 28a, 28b and 28c, one for each of the conductors 12a, 12b and 12c, extend from the primary conduit 16 to openings in a flange F in the wellhead. The primary conduit 16, manifold cap 26 and elongated conduits 28a, 28b and 28c are formed as a single unit of a non-ferromagnetic metal such as stainless steel, with fluid-tight connections between them. These connections are accomplished through soldering or other suitable connections.

As shown best in FIG. 5, the manifold cap 26 has an outer ledge 30 which engages the upper end of the primary conduit 16, and inner ledges 32 for receiving the lower ends of the elongated rigid conduits 28a, 28b and 28c. As also shown in FIG. 5, the conductors 12a, 12b and 12c extend through the rigid conduits 28a, 28b and 28c, the latter serving to isolate the conductors from the well fluids.

Referring to FIG. 14, after the primary conduit 16 is positioned over the conductors 12a, 12b and 12c and the back-up bushing 24, putty sections 22a and 22b, seal 20, and a portion of the cable 10, to where a lower edge 31 of the manifold cap 26 engages the back-up bushing 24, a compression tool generally designated by reference numeral 34 is mounted as shown in FIG. 14. A pair of lower sleeved sections 36 are mounted onto the armored cladding 14 of the conductor cable 10 and clamped in place as shown generally by clamps 38. At this position, for the embodiment described in U.S. patent application Ser. No. 08/633,244, filed Apr. 16, 1996, a pair of upper sleeves 40, are mounted over the elongated conduits 28a, 28b and 28c. The upper sleeves 40 have an inner opening that is large enough to surround the elongated rigid tubes 28a, 28b and 28c, but small enough to engage the upper surface of the manifold cap 26. A pair of arms 42, pivotally connected to the lower sleeves 36, operate to pull the primary conduit 16 downwardly in the direction of arrow 44 to the position shown in FIG. 14, through a pair of links 45, when the arms 42 are moved in the direction of the arrows 46. For the invention of the continuation-inpart application, the elongated conduits 28a, 28b and 28c will likely be eliminated.

This downward movement of the manifold cap 26 against the back-up bushing 24 compresses the still-formable epoxy putty 22 so that it completely fills the inner passageway of the rigid conduit 16. The primary conduit 16 has a series of saw tooth-shaped grooves 48 located on its inner surface or other means for holding the primary conduit 16 firmly in place when the epoxy putty 22a and 22b hardens and to hold the cable 10 firmly in conduit 16 under pressure.

The seal formed by this arrangement of parts has been found to be effective in blocking the flow of fluids at high well pressures. As shown in FIG. 7, the elastomeric seal 20 can be formed with a beveled lower surface 50 and sleeves 52 which extend along the conductors 12a, 12b and 12c for providing better contact between the elastomeric seal 20 and the inner wall of the primary conduit 16 and with the insulation I on the outer surface of the conductors 12a, 12b and 12c.

The elastomeric seal 20 is self-energized because it is slightly larger in diameter than the elongated opening in the primary conduit 16 and the openings 20a, 20b and 20c are slightly smaller than the insulated conductors 12a, 12b and 12c for providing an interference fit with them. When the primary conduit 16 is installed and the ledge 31 of the manifold cap 26 pushes against the back-up bushing 24, the epoxy putty 22a and 22b is compressed and extruded in and around all the small spaces associated with the conduit 10, the insulation jacket inside the conduit 10, the seal 20, the insulation I on the conductors 12a, 12b and 12c, and the back-up bushing 24. When the epoxy putty 22a and 22b hardens to a relatively hard mass, it confines the seal 20 as well as the conductor insulation I and the internal insulation jacket (not shown) in the cable 10. This confining action, in addition to providing an effective seal when the well is pressured, also prevents gas and other fluids entrained in the elastomeric seal 20 and other resilient materials such as the insulation I from expanding out of the primary conduit 16 and off of the insulated conductors. This condition could occur when pressure is released from the well causing fluid entrained under pressure in the seal 20, insulation I, and the insulation jacket in the well cable 10, to expand and rupture the seal and insulations, causing leakage and electrical short circuits. Thus, the confined seal is self-energized and operates as a two-way seal.

As mentioned above, for the invention in U.S. patent application Ser. No. 08/633,244, filed Apr. 16, 1996, the rigid, elongated tubes 28a, 28b and 28c serve as conduits for the conductors 12a, 12b and 12c and isolate them from the annulus of the well casing. This is done, as shown in FIG. 3, through the fluid-tight connection between the rigid tubes 28a, 28b and 28c and the manifold cap 26 (FIG. 5), as well as a rigid connection between the tubes 28a, 28b and 28c and the flange F of the wellhead WH. This connection is a conventional ferrule-type fitting, generally designated by reference numeral 54, for connecting the rigid tubes 28 to cooperating rigid tubes 56 that extend through the flange F and adapter spool AS. Another ferrule-type fitting 58, described in detail in PCT application WO 94/25726, connects the tubes 56 to a like number of flexible housings 60 that extend through fittings 62 to a fitting 64 that couples a splice housing 66 to the Tee 8 and cable seal termination 7. Although the splice 5 and its associated hardware are eliminated in the present invention, they will be described for a better understanding of the prior art.

The electrical conductors 6a, 6b and 6c extend through an internal seal (not shown) of the cable seal termination 7 in order to block the flow of gas and other fluids, internal flames and explosions originating within the well from spreading into the armored conductor cable 2. The Tee 8 includes a breather tube 8a for venting gases and other fluids from the well in the event of a failure of the primary seal 20.

The Tee 8 forms a pathway for the conductors 6a, 6b and 6c. The housing 66 protects splices or other connections between the conductors 6a, 6b and 6c which are connected to the external power source, and the conductors 12a, 12b and 12c connected to the downhole equipment.

Because it is possible for the insulation I of the conductors 12a, 12b and 12c to serve as conduits for gas and other fluids originating from the well, the insulated ends of the conductors 12 are inserted into vented rubber seals 68 described in PCT application WO 94/25726, before the uninsulated ends of the conductors 12a, 12b and 12c are electrically connected to the conductor 6a, 6b and 6c. The splice connections S will not be described in detail since they are shown and described in U.S. Pat. No. 5,289,882, and in PCT application WO 94/25726, the descriptions and drawings of which are incorporated by reference herein as though fully set forth.

Figure 15:
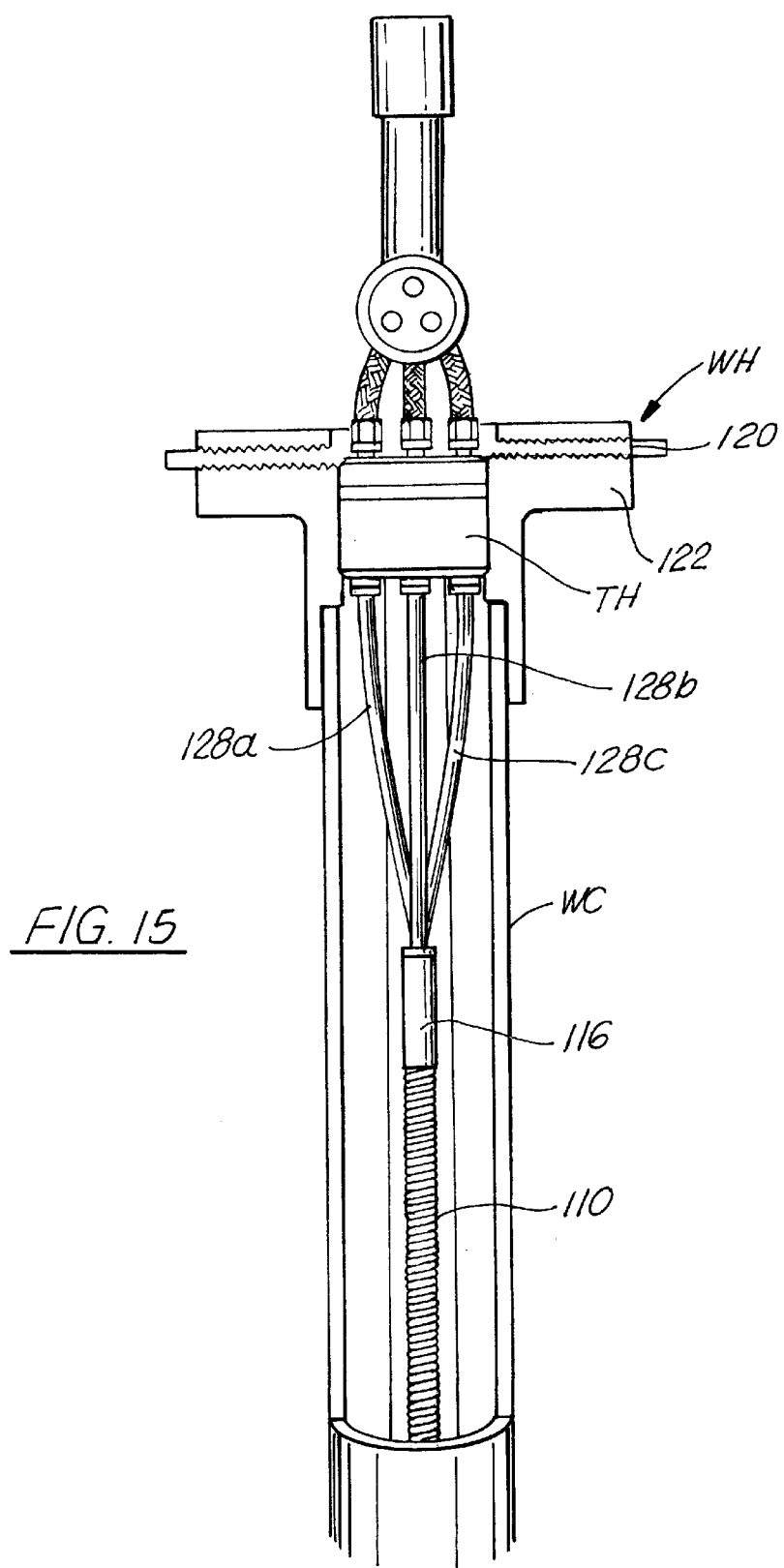
FIG. 15 is a front elevational view, partially in section, which shows the invention of U.S. patent application Ser. No. 08/633,244, filed Apr. 16, 1996, entitled "Underground Well Electrical Cable Transition, Seal and Method;" now U.S. Pat. No. 5,762,135 used in another type of wellhead barrier.

FIG. 15 illustrates an alternative for the penetrator described in U.S. patent application Ser. No. 08/633,244, filed Apr. 16, 1996. In FIG. 15, the same internal seal discussed above for conductor cable 110 is contained in a rigid primary conduit 116. Rigid elongated tubes 128a, 128b and 128c extend from the primary conduit 116 for encasing the conductors in the same manner shown in FIGS. 2–4. However, in this embodiment, the tubing hanger TH forms the wellhead barrier WH for the well that must be penetrated by the conductors (not shown in detail). The tubing hanger TH is supported in the well casing WC and secured in place by bolts 120, which are threaded through well bore casing flange 122 such that they contact the tubing hanger TH. Thus, in this application an upper adapter flange of the type shown in FIGS. 2–4 is not used in forming the wellhead WH.

Figure 16:
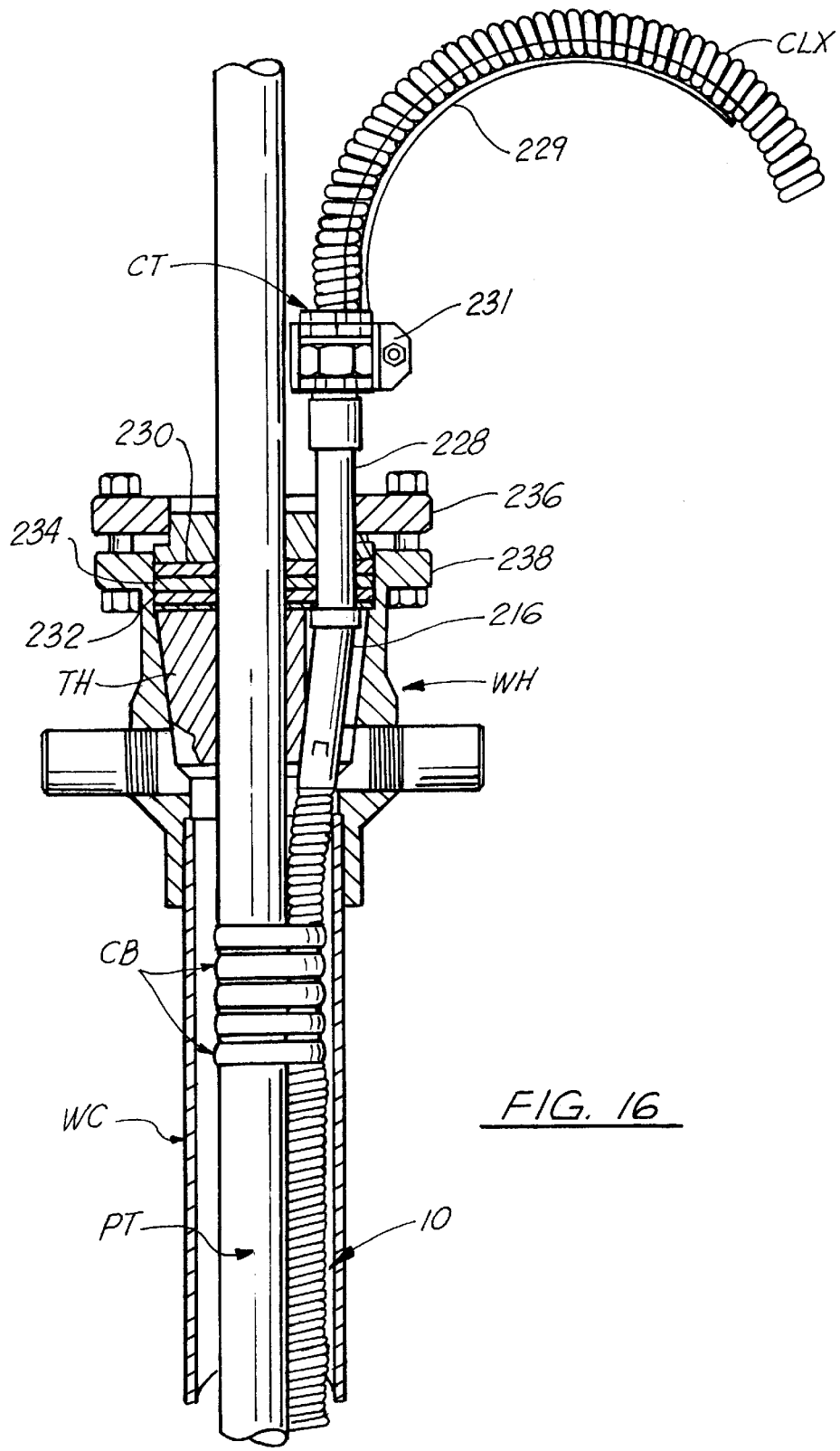
FIG. 16 is a front elevational view, partially in section, which shows a wellhead with a single penetrator tube in which the present invention is particularly suited.
Figure 17A:
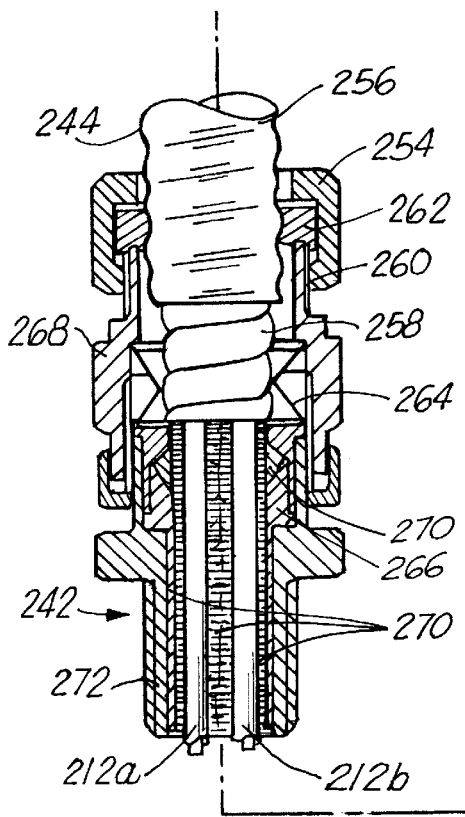
FIG. 17a is a partial sectional view of a secondary seal for use with the penetrator of FIG. 17.
Figure 17B:
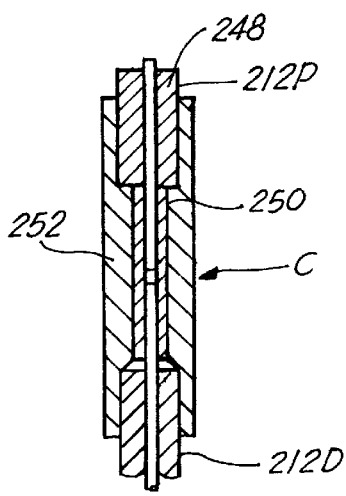
FIG. 17b is a sectional view of the splice shown generally in FIG. 17.
Figure 17:
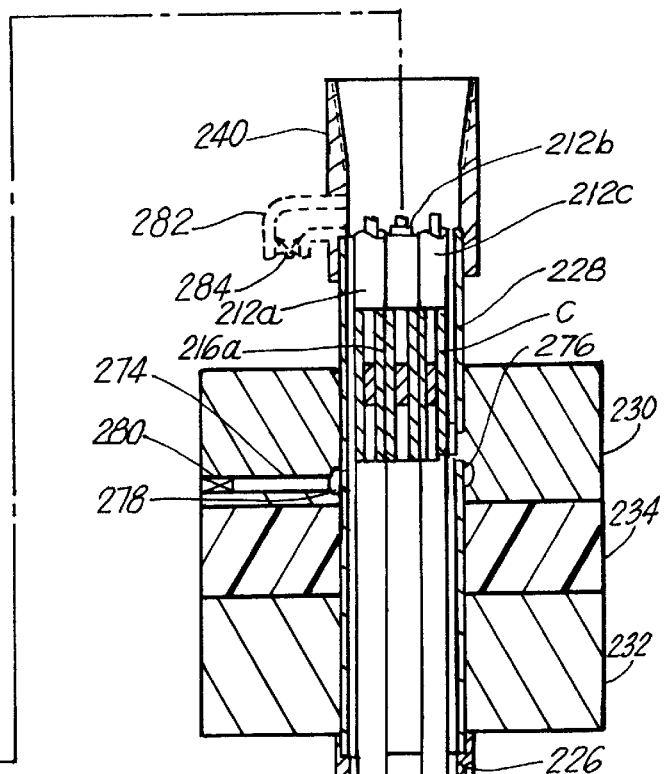
FIG. 17 is a sectional view of the penetrator of the present invention.

FIGS. 16–17 illustrate an embodiment of the transition or penetrator which embodies the present invention, which also has an internal confined seal of the type described above that is contained in the same type of rigid primary conduit 216. However, in this application only a single, elongated conduit or penetrator tube 228 extends through a passageway in the wellhead barrier WH. The wellhead barrier WH includes split upper and lower back up plates 230, 232 for holding a split elastomeric seal 234, for sealing the exterior of the penetrator tube 228 to the wellhead barrier WH. A split holding flange 236 is bolted to a lower wellhead flange 238 for clamping the back up plates 230, 232 and the seal 234. As shown in FIG. 16, the tubing hanger TH is of the slip-type where production tubing PT is held by teeth on the tubing hanger, which is known in the art. Cable bands CB hold the pump cable 10 to the production tubing PT.

Conductor wire from the power source (see FIG. 1) is run through standard CLX continuous corrugated metal sheath cable to the wellhead barrier WH. The cable is connected to a penetrator tube 228 by means of a letdown CLX continuous corrugated metal sheath cable terminator CT. The bend radius of the CLX continuous corrugated metal sheath cable is controlled by the use of a cable trough 229 connected to a clamp 231.

As shown in FIG. 17, insulated conductors 212a, 212b and 212c extend through the penetrator tube 228. A manifold cap 226 is secured to the penetrator tube 228 by soldering or other acceptable methods. A conduit fitting 240 is used to connect a portion of the penetrator tube 228 that extends out of the wellhead barrier WH to other conduit 244 that leads to the power source through a secondary approved seal 242 shown in FIG. 17a and described in detail below.

The transition shown in FIG. 17 has a lower or primary seal 246 which is an elastomeric seal of the type described in detail above, except that instead of a kneadable epoxy, a poured or liquid epoxy or cement is preferably used. This seal will not be described in detail as it has already been described. The transition also includes a connection such as a splice designated generally by reference letter C located between the primary seal 246 and the secondary seal 242 as shown in FIG. 17a. The connection C can be a splice between insulated conductors 212a, 212b and 212c as described, or it can be any other type of connection suitable in this environment, such as a plug or receptable connection.

The connection C for one of the conductors 212 is shown in detail in FIG. 17b, where the conductor extending from the downhole equipment is designated by reference numeral 212D and the conductor extending from the power supply is designated with reference numeral 212P. As shown, the insulation is stripped off of the ends of both of the conductors 212P and 212D and the conductors are positioned end-to-end relative to each other. A sleeve 250 formed of a conductive material such as copper is placed over the exposed ends of the conductors and crimped in place in order to form a conductive connection between the cables. An outer insulating sheath 252 is placed over the exposed ends of the conductor wires and the tube 250 in order to insulate the wires from adjacent conductor wires. This type of splice connection is only one of many embodiments that can be utilized in accordance with the invention, with plug-type receptacles (not shown) or other suitable connectors also contemplated as falling within the scope of the invention.

The connection C is formed between the primary seal 246 and an upper, approved seal 242. This upper seal can be an elastomeric seal identical in structure to the elastomeric seal 246 (see FIG. 19) or it can be a seal of the type shown in FIG. 17b, which is a known cable gland seal suitable for use with armored metal clad cable of the type shown.

As shown in FIG. 17a, a length of the conductor cable 244 extends through a nut assembly 254, with outer cable jacket 256 extending into the nut assembly 254, and a length of corrugated armor 258 being exposed. The insulated conductor wires 212 extend from the end of the exposed corrugated armor 258. The nut assembly includes a seal 260 and washer 262 for providing the upper portion of the seal 242.

The lower portion of the seal is formed of a grounding ring assembly 264 and a compound pot 266, which are covered by a middle nut section 268. The spaces around and between the conductor wires 212 and between the conductor wires and the compound pot 266 are filled with an epoxy compound 270 having a composition of the type described above. A seal body barrier connection 272 with a threaded lower end completes the seal and is used for connecting it to the standard fitting 240 shown in FIG. 17. A suitable seal of this type is a Hawke Brand cable gland type N711. With this type of seal, which has been approved by a NRTL, rainwater or other liquids are prevented from being transmitted into the penetrator tube 216 and combustible or flammable fluids are prevented from being transmitted out of the penetrator tube 216 from between the insulated conductor cables 212. Combustible or flammable fluids inside of the tube 216 are also prevented from escaping into or through the cable 256.

As shown in FIG. 17, there is no sealing material between the conductor cables 212a, 212b or 212c, in the sections between the primary and secondary seals, a void 216a being formed in those spaces. In that void space 216a, in the embodiment shown in FIG. 17, a vent passage 274 is formed in the upper backup plate 230 for venting any fluids that might bypass the lower seal 246 to the atmosphere. The vent passage 274 communicates with the interior of the penetrator tube 216 through a hole 276 located through the wall of the tube 216 and into a groove 278 formed around the periphery of the upper backup plate 230. In this way, if the primary seal fails and combustible or flammable fluid enters the void space 216a, the fluids will be vented to the atmosphere through the hole 276, groove 278 and passage 274. As shown schematically in FIG. 17, if this transition is used in an area classified as hazardous, a flame arrestor 280 is provided in the end of the opening 274.

Alternatively, a vent 282, shown by the broken lines in FIG. 17, could be formed in the conduct fitting 240. In addition, a suitable flame arrestor 284 could be provided in the vent 282.

Other suitable types of drains or vents could also be provided at a location between the primary seal 246 and the secondary seal 242. The important factor is that the drain or vent be located between the two seals and allow combustible or flammable well fluids to vent to the atmosphere that might escape past the primary seal 246. This structure prevents these fluids from migrating through electrical cable or conduits to other equipment that could cause an explosion.

Figures 17C, 17D:
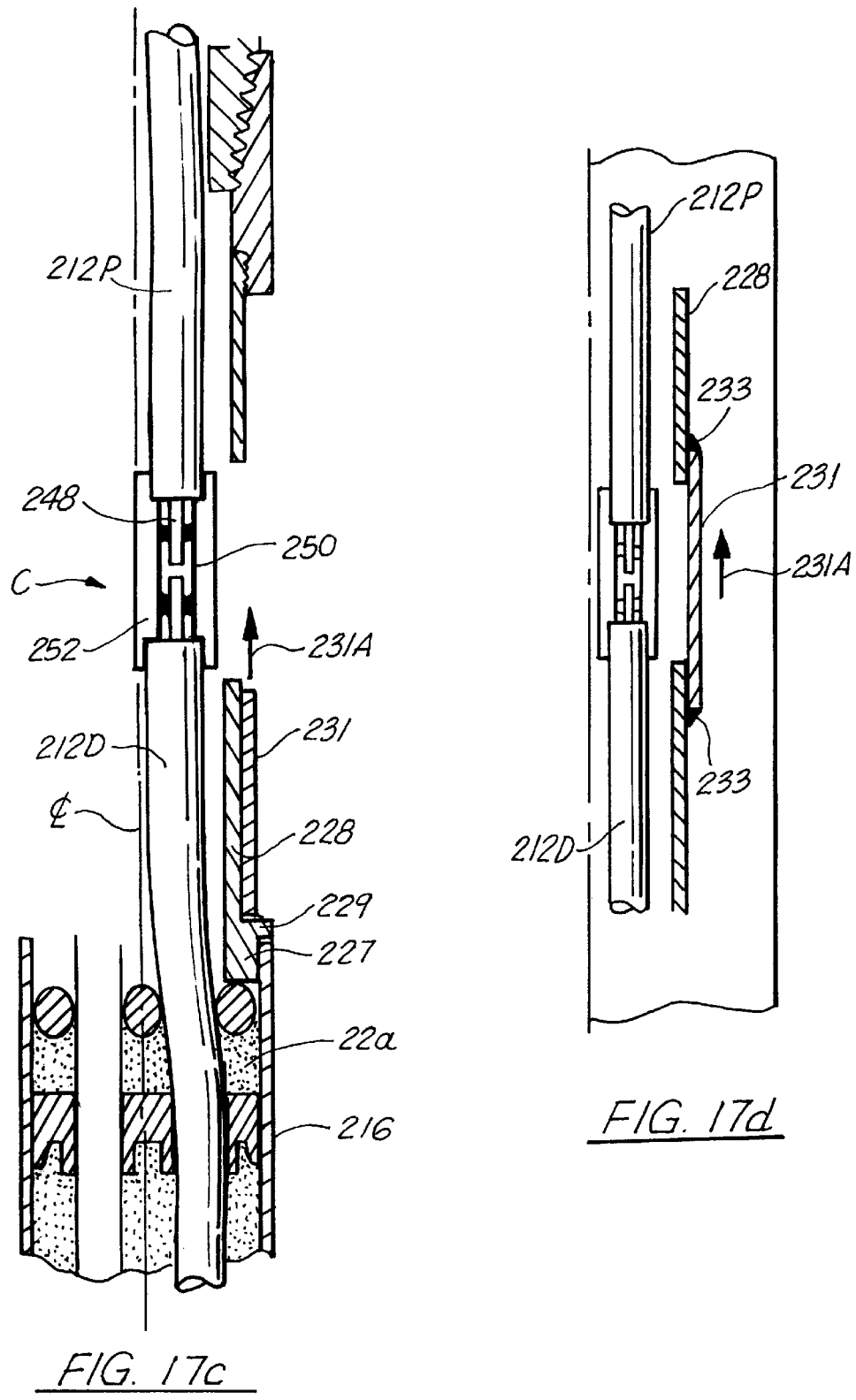
FIG. 17c is a sectional view of another version of the penetrator shown in FIG. 17, with a slide sleeve for allowing the splices to be formed.
FIG. 17d is a partial sectional view of the slide sleeve secured to the penetrator tube.

A variation of the transition in FIG. 17 is shown in FIGS. 17c and 17d. In this variation, the penetrator tube 228 is formed with a flange 227 that replaces the manifold cap 226 (see FIG. 17) and includes a ledge 229 that engages the primary conduit 216. A sleeve 231 is mounted on the outer surface of the penetrator tube 228 and placed in the position shown in FIG. 17c so the splice connections between the conductors 212P and 212D can be formed.

After the splices or other connections are formed, the sleeve 231 is moved in the direction of arrow 231A to the position shown in FIG. 17d and soldered or welded in place onto the penetrator tube 228 as shown by welds 233. By allowing access to the splice connections after the transition is assembled, the epoxy putty 22a of a kneadable, non-liquid type can be used in forming the primary seal.

Figure 18:
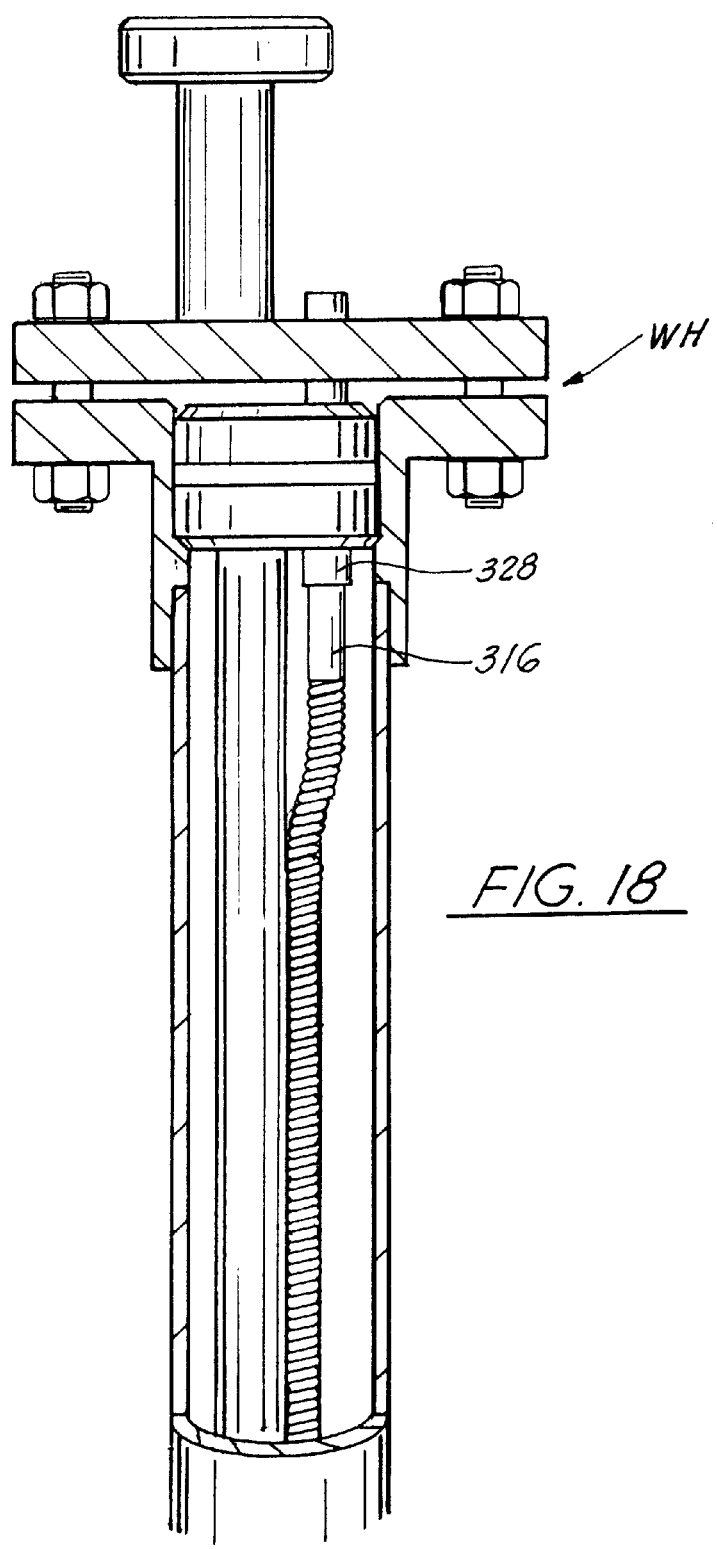
FIG. 18 is a front view, partially in section, which shows the invention used with another type of single penetrator tube.
Figure 19:
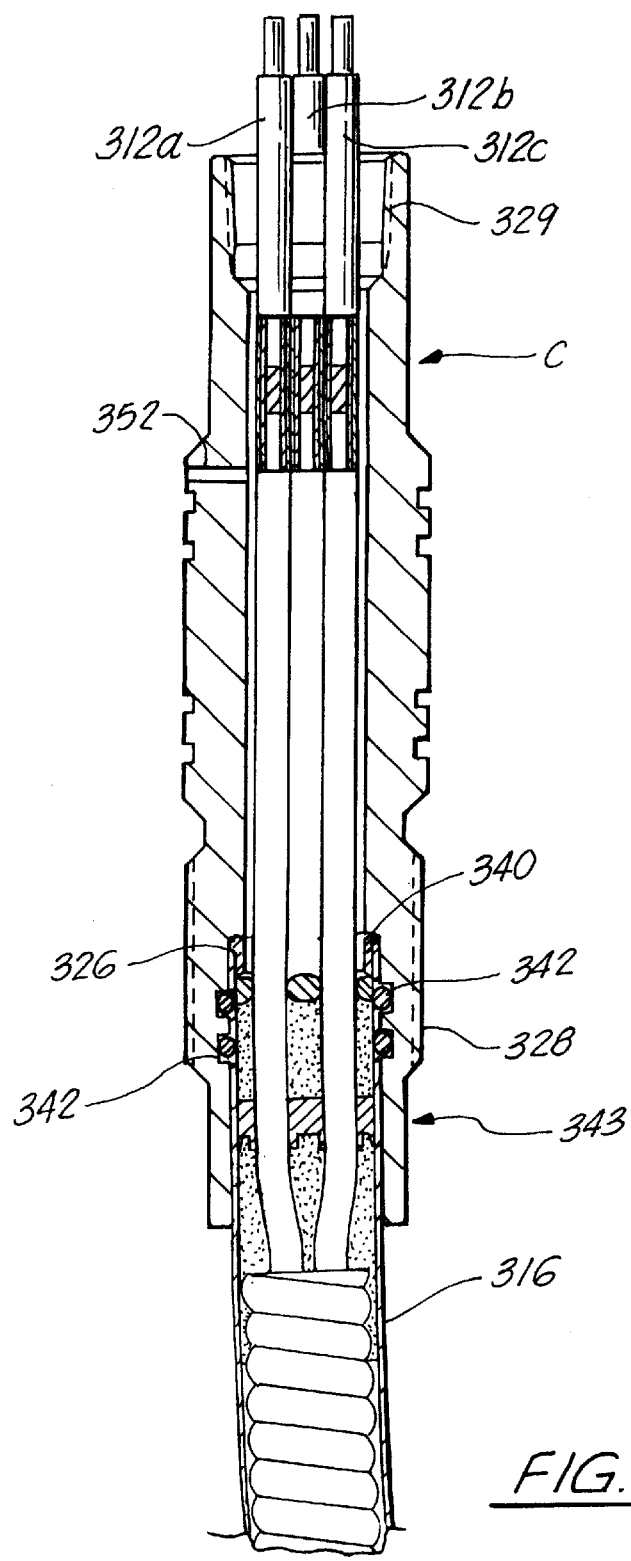
FIG. 19 is a sectional view of the penetrator of FIG. 18.

FIGS. 18 and 19 illustrate another embodiment of the invention for this application. In this embodiment, a rigid primary tube 316 is mounted to the lower end of a mandrel tube 328. A manifold cap 326 is secured to the primary tube 316 by soldering or the like and abuts an internal shoulder 340 formed in the mandrel tube 328. The conductors 312a, 312b and 312c extend through the mandrel tube 328, which in turn extend through the wellhead WH in a way similar to the embodiment shown in FIG. 17. A pair of elastomeric O-rings 342 seal the space between the primary conduit 316 and the inner surface of the mandrel tube 328.

As shown in FIG. 19, a primary seal is identified generally by reference numeral 343, which has the same structure as the elastomeric seal described above and shown as primary seal 246 in FIG. 17. However, other approved seals could also be used as the primary seal in this embodiment.

The secondary seal (not shown) is preferably of the same structure as shown in FIG. 17a and is connected to the mandrel tube 328 at the conduit fitting 329.

A connection C for the conductors, similar to the one shown in FIGS. 17 and 17b, is formed between the primary and secondary seals. A vent 352 is formed in the mandrel tube 328 at a suitable location between the two seals. The vent 352 communicates to the atmosphere through an opening formed in the surrounding plates (not shown) by use of a passageway and groove arrangement similar to the one discussed above in conjunction with FIG. 17.

Alternatively to providing a secondary seal that is designed to prevent fluid from flowing out of the transition, with a vent located between the primary and secondary seals, the secondary seal with the structure shown in FIG. 17a can be formed with a tube extending through the epoxy located between the conductors allowing combustible or flammable well fluids to flow through the seal and CLX continuous corrugated metal sheath CRX cable to the vented junction box VJB shown in FIG. 1, where they are vented to the atmosphere in a known manner. However, the secondary seal will still prevent these fluids from migrating through the electrical cables to equipment that could cause an explosion.

As discussed above, the invention is directed to providing a primary approved seal and a secondary approved seal, with a splice or other connection located between them for eliminating the splice or other connection and its associated equipment outside the wellhead. A vent is provided between the seals in order to vent combustible or flammable well fluids to the atmosphere in case of leakage. In this way, a transition is provided which is substantially less expensive both in equipment and installation costs than previously known.

The foregoing disclosure and description are intended to be illustrative and explanatory of the invention, thereof, and various changes in the size, shape and materials, as well as the details of the illustrated operation and construction may be made without departing from the spirit and scope of the invention.

What is claimed:

1. A transition for insulated electrical well cable adapted for passage through a wellhead barrier of an underground well leading to an electrical power cable connected to an external electrical power source, the transition comprising:

a) a first length of insulated electrical well cable in the wellhead barrier connected to a downhole equipment;

b) a second length of insulated electrical well cable extending out of the wellhead barrier connected to an external power source;

c) a primary seal inside the wellhead barrier for sealing said first length of cable connected to the downhole equipment;

d) a secondary seal outside the wellhead barrier for sealing said second length of cable connected to the external power source;

e) a connection between the first and second lengths of cable located between the primary and secondary seals;

f) a drain for venting well fluids to the atmosphere that leak past the primary seal.

2. The transition of claim 1, wherein the drain is located between the primary and secondary seals.

* * * * *